United States Patent [19]

Humme et al.

[11] 4,251,645
[45] Feb. 17, 1981

[54] THERMOPLASTIC MOULDING COMPOSITIONS

[75] Inventors: Gert Humme, Odenthal; Karl-Heinz Ott, Leverkusen; Dietrich Hardt, Cologne; Karl Dinges, Odenthal, all of Fed. Rep. of Germany

[73] Assignee: Bayer Aktiengesellschaft, Leverkusen, Fed. Rep. of Germany

[21] Appl. No.: 887,733

[22] Filed: Mar. 17, 1978

Related U.S. Application Data

[63] Continuation of Ser. No. 707,547, Jul. 22, 1976, abandoned.

[30] Foreign Application Priority Data

Jul. 30, 1975 [DE] Fed. Rep. of Germany ........ 2533990
Apr. 14, 1976 [DE] Fed. Rep. of Germany ....... 2616375

[51] Int. Cl.$^3$ ............................................. C08L 51/04
[52] U.S. Cl. .......................................... 525/75; 525/84
[58] Field of Search ............. 260/876 R, 876; 525/75, 525/84

[56] References Cited

U.S. PATENT DOCUMENTS

| | | | |
|---|---|---|---|
| 2,802,809 | 8/1957 | Hayes | 260/876 R |
| 3,287,433 | 11/1966 | Saito et al. | 260/876 R |
| 3,636,138 | 1/1972 | Beer | 260/876 R |
| 3,678,132 | 7/1972 | Isogawa et al. | 260/876 R |
| 3,683,050 | 8/1972 | Meredith et al. | 260/876 R |
| 3,775,514 | 11/1973 | Amagi et al. | 260/876 R |
| 4,042,548 | 7/1977 | Abe et al. | 260/23 XA |

FOREIGN PATENT DOCUMENTS

1203959 10/1965 Fed. Rep. of Germany .
1745945 6/1976 Fed. Rep. of Germany .

OTHER PUBLICATIONS

Du Pont Dev. Prods. Bulletin No. 18, Dec., 1961.
Du Pont Dev. Prods. Bulletin No. 20, May, 1963.
Ham, 38 J. Poly. Sci., 543-545 (1959).

*Primary Examiner*—J. Ziegler
*Attorney, Agent, or Firm*—Connolly and Hutz

[57] ABSTRACT

Thermoplastic moulding compositions of
(A) 20 to 99 parts by weight of a vinyl chloride homopolymer or copolymer containing at least 80% by weight of vinyl chloride and having K-values of from 50 to 80,
(B) 80 to 1 part by weight of a graft polymer produced by the solution polymerization in an organic solvent of
  (a) styrene and/or methyl methacrylate or
  (b) styrene and acrylonitrile and, optionally, methyl methacrylate
in the presence of an EPDM rubber.

7 Claims, No Drawings

THERMOPLASTIC MOULDING COMPOSITIONS

CROSS-REFERENCE TO RELATED APPLICATION

This application is a continuation of application Ser. No. 707,547 filed July 22, 1976 and now abandoned.

This invention relates to thermoplastic moulding compositions predominantly containing polyvinyl chloride with high impact strength and notched impact strength, excellent processing properties and high resistance to light and ageing. The compositions consist of polyvinyl chloride or vinyl chloride copolymers and graft polymers of styrene or styrene and acrylonitrile and, optionally, monomers copolymerisable therewith on an EPDM rubber (ethylene-propylene-diene monomer) as graft base.

Polyvinyl chloride is a valuable chemical material with balanced technological properties. Unfortunately, it breaks very easily, especially at low temperatures. Accordingly, its toughness has to be improved, which in principle can be achieved by adding suitable polymers (or by reacting the vinyl chloride or polyvinyl chloride with such polymers). This "high-impact modification" of polyvinyl chloride and the "high-impact modifiers" with which it is obtained have to meet a number of additional requirements, namely (1) small quantities of high-impact modifiers must be sufficient to obtain the desired modification;
(2) the favourable properties of the polyvinyl chloride must not be adversely affected;
(3) the high impact modifiers must be able to be readily incorporated into polyvinyl chloride;
(4) even when the polyvinyl chloride is used in the open, the modifiers must be stable to light and ageing over prolonged periods;
(5) during processing of the high-impact-modified polyvinyl chloride, toughness must remain constant even in the event of fluctuations in the processing conditions (temperature processing time and shear effect);
(6) permeability to light and transparency must not be adversely affected;
(7) the high-impact modified polyvinyl chlorides must be able to be stabilised with the usual additives;
(8) the high-impact modifiers must be physiologically acceptable.

Hitherto, high-impact modifiers which satisfy all these requirements have never been found. There are known only modifiers for special applications which, even for their own particular application, are not entirely satisfactory.

Accordingly, the high-impact modification of polyvinyl chloride is based on the addition of elastomers, for example rubbers, rubber-like polymers or rubber-modified thermoplasts which have only limited compatibility with polyvinyl chloride. "Addition" in this context means either mechanical mixing in or the polymerisation of vinyl chloride in the presence of the additives.

The elastomers are required to have the lowest possible second order transition temperatures in order to guarantee high toughness at low temperatures. The elastomeric component has to be present as a separate phase in the polyvinyl chloride (which acts as a matrix). If the distinction between the two phase disappears, for example as a result of excessive processing temperatures or prolonged shear action, the toughness characteristic of the product has been found by experience to decrease rapidly.

In practice, only a few elastomers have proved to be suitable for the high-impact modification of polyvinyl chloride. These elastomers are primarily (A) butadiene/styrene/acrylonitrile graft polymers (ABS) of different structure, including those containing methyl methacrylate in copolymerised form (MBS) (for the production of highly transparent high-impact polyvinyl chloride articles). Graft polymers of this kind are added to the polyvinyl chloride.

(B) chlorinated polyethylene of a certain molecular weight and with a certain chlorine content. The chlorinated polyethylene is also added to the polyvinyl chloride.

(C) ethylene copolymers, especially ethylene-vinyl acetate copolymers, which are either added to the polyvinyl chloride or reacted with monomeric vinyl chloride to form high-impact polyvinyl chloride graft polymers or high-impact modifiers.

These three main types differ from one another as follows in regard to their effectiveness in the polyvinyl chloride:

|  | A | B | C |
|---|---|---|---|
| toughness at 20° C. | very good | good | good |
| toughness at low temperatures | good | limited | limited |
| processibility | satisfactory | poor | good |
| processing range | good | adequate | poor |
| light and ageing stability | very poor | limited | very good |

Accordingly ABS/MBS graft polymers (A) are excellent high-impact modifiers, even for low temperatures. However, they are totally unsuitable for external use on account of their entirely inadequate ageing properties.

Chlorinated polyethylene (B) develops a moderate toughness which deteriorates quickly at low temperatures. Processibility is poor and the processing range inadequate. Light and ageing stability are both limited.

By contrast, special copolymers of ethylene and vinyl acetate (C) show the highest light and ageing stability, but do not satisfy all requirements in regard to toughness at low temperatures and particularly in regard to their processing range.

Attempts have also been made to use EPDM rubbers as high-impact modifiers for polyvinyl chloride. Thus, German Auslegeschrift No. 1,203,959 describes graft polymers of vinyl chloride on EPDM which may be described as high-impact polyvinyl chloride. Unfortunately, products of this kind have never been successfully used in practice because they are extremely difficult to produce on account of the insolubility of EPDM in monomeric vinyl chloride. The products obtained are non-uniform and difficult to reproduce in regard to their properties. Apart from their poor thermal stability, they are difficult to process and readily form jelly like nodules ("fish eyes") in the finished article. In addition, the toughness levels which can be obtained are only very limited by comparison with the quantity of rubber used (22.3 cm kp/cm$^2$) for an EPDM content of 6.5% by weight.

Also, German Offenlegungsschrift No. 1,745,945 describes moulding compositions consisting of polyvinyl chloride and graft polymers of different monomers on EPDM elastomers. However, these moulding compositions have no connection with the high-impact modification of polyvinyl chloride because they contain approximately 50% by weight of graft polymer (styrene/methyl methacrylate on EPDM) (Example IV, 4B). Accordingly, the moulding compositions cannot be described as polyvinyl chloride compositions. Also, toughness is limited on account of the large quantity of rubber (11% by weight) and resistance to ageing can only be obtained by adding UV-absorbers. According to German Offenlegungsschrift No. 1,745,945, graft polymers on EPDM rubbers are obtained by initially peroxidising the graft base and subsequently grafting on the monomers. This results in uncontrollable radical degradation and "reconstruction" reactions and hence in the formation of low molecular weight fractions and labile sites in the molecule, so that the graft polymers themselves show poor resistance to ageing (cf. also German Auslegeschrift No. 1,203,959).

Accordingly, it is how the graft polymers on EPDM are produced, what structure they have and what monomers are grafted on which determine not only their properties, but also their effectiveness as high-impact modifiers. The partial compatibility with polyvinyl chloride which is required is influenced in this way. Neither complete compatibility nor complete incompatibility of the modifier produces the best properties. Rather, it is a partial compatibility with polyvinyl chloride which is specific to each high-impact modifier which is required.

The present invention is based on the discovery that certain graft polymers of styrene, acrylonitrile, methacrylic acid esters and mixtures thereof on EPDM-rubber are excellent high-impact modifiers for polyvinyl chloride. These EPDM-graft polymers as high-impact modifiers for polyvinyl chloride combine for the first time properties which are only individually or partially present in products of other constitution and which could not even be obtained by combining those products. These properties are an excellent increase in toughness in polyvinyl chloride, even at low temperatures, high reliability in processing (processing range) and high stability to light and ageing.

Accordingly, the present invention provides preferred thermoplastic moulding compositions, containing
(A) 70 to 99 parts by weight of a vinyl chloride homopolymer or copolymer containing at least 80% by weight of vinyl chloride and having K-values of from 50 to 80; and
(B) from 30 to 1 part by weight of a graft polymer produced by the solution polymerisation in an organic solvent of
  (a) styrene and/or methyl methacrylate or
  (b) styrene and acrylonitrile and, optionally, methyl methacrylate
in the presence of an EPDM rubber.

Particularly preferred thermoplastic moulding compositions contain
(A) 75 to 96 parts by weight of polyvinyl chloride with K-values of from 50 to 80; and
(B) 4 to 25 parts by weight of a graft polymer produced by the solution polymerisation in benzene and/or toluene at 100° to 140° C. of styrene and acrylonitrile in the presence of an EPDM rubber with ethylidene-2-norbornene, dicyclo pentadiene or 1,4-hexadiene as diene component.

It is, of course also possible to produce mixtures of less than 70% by weight vinyl chloride polymer down to about 20% by weight and of more than 30% by weight of the graft copolymer, up to about 80% by weight.

EPDM-graft polymers

EPDM-graft polymers in the context of the invention are obtained by polymerising the graft monomers in the presence of the preformed EPDM rubber. In principle, it is possible to apply any known polymerisation process (emulsion, solution, bulk, suspension or precipitation polymerisation) and combinations thereof.

EPDM-rubber, graft base

In the context of the invention, "EPDM-rubbers" are copolymers of ethylene, propylene, and an unconjugated diene. The ratio by weight of ethylene to propylene may be from 75:25 to 40:60. The diene is incorporated in the tercopolymer in such quantities and in such form that iodine numbers of from 2 to 30 are measured, corresponding to between about 1 and 15 C=C-bonds per 1000 carbon atoms. The monomeric structural elements may be arranged either statistically or in blocks. Instead of using a diene, it is also possible to use mixtures of different dienes.

Preferred dienes are dicyclopentadiene, 1,4-hexadiene and 5-ethylidene-2-norbornene. It is also possible to use their homologues, such as alkylidene norbornene, tricyclo pentadiene, heptadiene and octadiene.

EPDM rubbers with a Mooney plasticity (ML 1+4', 100° C.) of from 20 to 150 are particularly preferred.

Graft monomers, graft polymer

In the context of the invention, graft monomers are styrene and mixtures of styrene and acrylonitrile, methyl methacrylate and mixtures thereof, also mixtures of styrene, acrylonitrile and methyl methacrylate. Styrene may be completely or partly replaced by α-methyl styrene.

It is preferred to use mixtures of styrene and acrylonitrile in the following ratio, $$1 < \frac{\text{Weight of styrene}}{\text{Weight of acrylonitrile}} < 9$$

preferably $$1.5 < \frac{\text{Weight of styrene}}{\text{Weight of acrylonitrile}} < 4$$

The ratio by weight of graft base to graft monomer is as follows:

$$0.33 < \frac{\text{graft base}}{\text{graft monomer}} < 4$$

preferably $$0.5 < \frac{\text{graft base}}{\text{graft monomer}} < 2.5$$

Graft polymerisation

Graft polymerisation means polymerisation of the graft monomers in the presence of the graft base. During the reaction part of the monomers is polymerised onto the graft base in the form of a side chain. This part of the preformed polymer is chemically attached to the graft base. In addition, a free polymer of the graft monomers is formed. The ratio by weight of the polymer chemically attached (grafted) to the graft base to the free polymer is known as the degree of grafting. This degree of grafting and the molecular weight both of the grafted polymer and of the free polymer are governed to a very considerable extent by the polymerisation conditions (temperature, activation, molecular weight regulation, solvents, stirring conditions and quantities of monomer). Accordingly, the polymerisation conditions have to be carefully selected to obtain products with optimum properties.

The polymerisation activator, polymerisation velocity and polymerisation temperature are related to one another. For a given polymerisation temperature, it is possible to select suitable activators on the basis of the half lives tabulated in the literature, and vice versa.

The graft polymerisation reaction requires temperatures of at least 80° C., preferably in the range of from 100° to 140° C., and with particular preference in the range from 110° to 130° C.

Peroxide activators, such as di-tert-butyl peroxide, cumene hydroperoxide, tert.-butyl hydroperoxide, dicumyl peroxide are particularly suitable.

In cases where reducing agents are added, it is also possible to use activators of which the rate of decomposition at the temperatures specified is too low.

Suitable molecular weight regulators are relatively long chain mercaptans, terpinolenes and $\alpha$-olefins.

The polymerisation process used in accordance with the invention is solution polymerisation, preferably in aromatic, hydrocarbons with a boiling point ($bp_{760}$) of from 80° to 150° C. It is particularly preferred to use benzene and toluene.

It is preferred to work with concentrations, i.e. with a ratio by weight of solvent to graft monomers plus graft base, of from 2.5:1 to 10:1, the preferred ratio for benzene being $\leq 10$ and for toluene $<5$.

Isolation of the EPDM-graft polymer

The EPDM graft polymer is preferably isolated by stripping and concentrating by evaporation in evaporation screws.

The polyvinyl chloride

Polymers of vinyl chloride suitable for use in accordance with the invention are vinyl chloride polymers which have been obtained by suspension, emulsion or bulk polymerisation and which have a K-value according to Fikentscher (H. F. Zeitschrift Fur Zellulose-Chemie 13 (1932), page 58) between 50 and 80, and copolymers of at least 80% by weight of vinyl chloride and up to 20% by weight of other copolymerised monomers. Other monomers which may be used either individually or in admixture are, for example, ethylene, propylene, butylene, vinyl esters of monocarboxylic acids, diesters of $\alpha,\beta$-unsaturated dicarboxylic acids, their anhydrides and simple and substituted amides; acrylic acid and methacrylic acid esters and vinylidene chloride.

Production of the moulding compositions according to the invention

Conventional high-speed mixers and roll stands are suitable for mixing and compounding. It is possible to start with powder-form material or granulated material. The compositions plasticised on rolls or in kneaders may also be pressed or calendered. Powder mixtures and granulates may be extruded, injection-moulded or blow-moulded by known methods.

The moulding compositions according to the invention may contain conventional stabilisers, i.e. stabilising systems based on lead, barium/cadmium, calcium/zinc, organo tin compounds or organic stabilisers for example, $\alpha$-phenyl indole, diphenyl thio urea, $\alpha$-amino crotonic acid esters, epoxidised fatty acid esters either individually or in combination. It is also possible to add lubricants for polyvinyl chloride.

Polymer and monomer plasticers may be added either individually or in combination to the moulding compositions. It is also possible to add physical or chemical blowing agents in order to obtain a foam structure under suitable processing conditions.

Conventional processing aids and flow aids may be added, just as in the processing of pure or high-impact polyvinyl chloride. Antistatic agents, UV-absorbers, antioxidants, flame-proofing agents, pigments and fillers may also be added.

The moulding compositions contain at most 30% by weight of EPDM-graft polymer. The maximum EPDM rubber content of the moulding compositions is 20% by weight. Instead of using a graft polymer, it is also possible to use mixtures of EPDM graft polymers with different ratios of graft base to graft monomers and/or of different EPDM rubbers.

Instead of using pure EPDM graft polymers, it is also possible to use mixtures of the graft polymers with copolymers of the graft monomers.

Properties and uses of the moulding compositions according to the invention

The composition according to the invention may be used as thermoplastic moulding compositions and represent hard, but very tough products of the high-impact polyvinyl chloride type. They are extremely tough, even at temperatures of down to $-40°$ C. Hardness, tensile strength, flexural strength and E-modulus comply with the requirements which rigid polyvinyl chloride has to satisfy.

The moulding composition may be processed at temperatures of up to 240° C. and, hence, are much more reliable in processing than standard high-impact polyvinyl chloride.

Finally, they show particularly high stability to light and ageing.

The moulding compositions according to the invention are used primarily for the production of profiles, extruded sheeting and injection-moulded articles. Particular applications for profiles are in the building and furniture sector, for example window profiles, door frames, balcony linings, cave gutters, signposts for roads, protective edges for stairs, curtain rails, pickets, bench profiles and different kinds of wall tiles etc. By injection moulding, it is possible to produce, for example, domestic and utility articles, small parts for the vehicle industry, housings for office machines and electrical appliances, also furniture and parts of furniture. Potential applications for calendered films are in the packaging sector, whilst specially coloured and patterned films may be used as a veneer and lining material in the furniture industry. High-impact bottles may be produced by the extrusion blowing process.

EXAMPLES

The following starting polymers were used for the Examples:

1. Production of the EPDM graft polymers

The EPDM graft polymers are produced in accordance with the following general composition:
E parts by weight of EPDM rubber are dissolved in
L parts by weight of solvent.
S parts by weight of styrene,
A parts by weight of acrylonitrile and
M parts by weight of methyl methacrylate are added and the solution heated to
T° C. (=polymerisation temperature). After the addition of
J parts by weight of initiator, polymerisation is carried out for
t hours at the above-mentioned polymerisation temperature.

The monomer conversions obtained amount to >98%. The polymer solution has added to it, based on the total: E+S+A+M, 0.5 part by weight of a phenolic antioxidant (2,6-di-tert-butyl-p-cresol) and 0.5 part by weight of a co-stabiliser (dilauryl thiodipropionate), after which the polymeric product is isolated by stripping. The crumbs obtained are dried at 70° C. in a vacuum drying cabinet. Polymerisation vessel: V2A steel, designed for pressures of up to 6 bars, wall sweeping stirrer designed for viscosities of >1000 poises.

Stripper: standard stripper of the kind commonly used in rubber technology.

The various EPDM graft polymers are shown in Table 1.

Since the monomer conversion amounts to 98% it is assumed for the purposes of further discussion that the rubber content of the graft polymer=quantity of EPDM rubber (E) used for the grafting reaction.

TABLE 1

| Number of the EPDM-graft polymer | 1 | 2 | 3 | 4 | 5 | 6 | 7 | 8 | 9 | 10 |
|---|---|---|---|---|---|---|---|---|---|---|
| Solvent (L)* | | | | | | | | | | |
| Type | B | B | B | B | B | T | T | T | T | T |
| Quantity | 500 | 500 | 500 | 500 | 500 | 300 | 300 | 300 | 300 | 300 |
| EPDM-rubber(E) | | | | | | | | | | |
| Quantity of rubber | 50 | 50 | 50 | 50 | 50 | 30 | 45 | 50 | 60 | 70 |
| Diene component** | EN | EN | DCPD | DCPD | HX | EN | EN | EN | EN | EN |
| Iodine No. | 23 | 30 | 27 | 12 | 13 | 24 | 24 | 24 | 24 | 24 |
| Mooney-value (ML 1 + 4', 100° C.) | 65 | 45 | 25 | 70 | 144 | 90 | 90 | 90 | 90 | 90 |
| Graft monomers | | | | | | | | | | |
| Styrene (S) | 37.5 | 37.5 | 37.5 | 37.5 | 37.5 | 52.5 | 41.3 | 37.5 | 30 | 22.5 |
| Acrylonitrile (A) | 12.5 | 12.5 | 12.5 | 12.5 | 12.5 | 17.5 | 13.7 | 12.5 | 10 | 7.5 |
| Methyl methacrylate (M) | — | — | — | — | — | — | — | — | — | — |
| Polymerisation temperature (T) | 120 | 120 | 120 | 120 | 120 | 120 | 120 | 120 | 120 | 120 |
| Initiator (J)*** | | | | | | | | | | |
| Peroxide | DTBP | DTBP | DTBP | DTBP | DTBP | DTBP | DTBP | DTBP | DTBP | DTBP |
| Quantity | 0.9 | 0.9 | 0.9 | 0.9 | 0.9 | 1.25 | 0.9 | 0.9 | 0.6 | 0.5 |
| Polymerisation time | 14 | 14 | 14 | 14 | 14 | 14 | 14 | 14 | 14 | 14 |

| Number of the EPDM-graft polymer | 11 | 12 | 13 | 14 | 15 | 16 | 17 | 18 | 19 |
|---|---|---|---|---|---|---|---|---|---|
| Solvent (L)* | | | | | | | | | |
| Type | T | T | T | B | T | B | B | B | T |
| Quantity | 300 | 250 | 250 | 500 | 250 | 500 | 500 | 500 | 250 |
| EPDM-rubber(E) | | | | | | | | | |
| Quantity of rubber | 80 | 50 | 45 | 43 | 43 | 43 | 50 | 50 | 50 |
| Diene component** | EN | EN | DCPD | DCPD | DCPD | DCPD | DCPD | DCPD | EN |
| Iodine No. | 24 | 24 | 12 | 12 | 12 | 12 | 12 | 12 | 24 |
| Mooney-value (ML 1 + 4', 100° C.) | 90 | 90 | 70 | 70 | 70 | 70 | 70 | 70 | 90 |
| Graft monomers | | | | | | | | | |
| Styrene (S) | 15 | 37.5 | 41.3 | 43 | 43 | 43 | 10 | 50 | 37.5 |
| Acrylonitrile (A) | 5 | 12.5 | 13.7 | 14 | 14 | 14 | 4. | —12.5 | 12.5 |
| Methyl methacrylate (M) | — | — | — | — | — | — | 36 | — | — |
| Polymerisation temperature (T) | 120 | 120 | 120 | 130 | 110 | 80 | 120 | 120 | 120 |
| Initiator (J)*** | | | | | | | | | |

TABLE 1-continued

| time | 14 | 14 | 14 | 10 | 20 | 28 | 14 | 14 | 14 |
|---|---|---|---|---|---|---|---|---|---|
| Peroxide | DTBP | DTBP | DTBP | DTBP | DTBP | BP | DTBP | DTBP | DICUP |
| Quantity | 0.3 | 0.9 | 0.9 | 0.9 | 0.9 | 1.5 | 0.9 | 0.9 | 1.5 |

Polymerisation
B = benzene,
T = toluene
**EN = 5-ethylidene-2-norbornene
DCPD = dicyclopentadiene
HX = 1,4-hexadiene
***DTBP = di-tert.-butyl peroxide
BP = benzoyl peroxide
DICUP = dicumyl peroxide

2. Production of the PVC blends

A suspension PVC with a K value of 68 (Vestolit VS 6858, a product of Chemische Werke Huls) was used for producing the thermoplastic moulding compositions. This suspension PVC was prestabilised as described below to form two different types and was subsequently further processed for producing the PVC moulding compositions according to the invention.

The PVC stabilised with a tin compound was produced as follows:

Polyvinyl chloride—Type Y 100 parts by weight of suspension polyvinyl chloride with a K-value of 68 were mixed with 1.5 parts by weight of di-n-octyl tin thio glycolic acid ester for 5 minutes in a high-speed mixer (2000 rpm), the temperature rising to 120° C. This was followed by cooling to room temperature at a reduced stirrer speed.

The PVC stabilised with a barium/cadmium compound was produced as follows:

Polyvinyl chloride—Type Z 100 parts by weight of suspension polyvinyl chloride with a K-value of 68 were mixed for 5 minutes in a high-speed mixer (2000 rpm) with 2.5 parts by weight of Ba/Cd laurate, 0.8 part by weight of triphenyl phosphite, 1.0 part by weight of epoxidised soya bean oil, 0.5 part by weightof dicarboxylic acid ester, 0.4 part by weight of montanic acid ester, 0.4 part by weight of polyethylene wax and 3.0 parts by weight of titanium dioxide, the temperature rising to 120° C. This was followed by cooling to room temperature at a reduced stirrer speed.

The polymer blends according to the invention were prepared with these prestabilised PVC compounds in accordance with the following specification:

The stabilised polyvinyl chloride and the particular graft polymer used were homogenised together on laboratory mixing rolls in the mixing ratio quoted in the Examples, drawn out into rough sheets and moulded into test specimens. Unless otherwise stated, the compound was intensively mixed for 10 minutes at 180° C. on mixing rolls and subsequently preheated at the same temperature for 7 minutes in the absence of pressure in a press, followed by moulding under pressure for 3 minutes to form sheets which were used for the production of standard test specimens.

3. Composition of comparison products included in the investigation

The following graft polymers were used as comparison products in the Examples:

Graft polymer O
graft polymer consisting of 50% by weight of polybutadiene and 50% by weight of styrene acrylonitrile in powder form.

Graft polymer P
graft polymer P consists of 50% by weight of an ethylene vinyl acetate copolymer with a vinyl acetate content of 45% by weight, melt index (ASTM-D-62T, condition E): 3.0, Mooney viscosity (DIN 53 523): 19 and 50% by weight PVC.

4. Mechanical Tests

The mechanical testing of the polymer blends was carried out in accordance with the Standards quoted below:

impact strength $a_n$, DIN 53 453 (kJ/m$^2$) temperatures: 20°, 0°, −20°, −40° C.

notched impact strength $a_k$, DIN 53 453 (kJ/m$^2$) 20°, 0°, −20°, −40° C.

Vicat temperature: DIN 53 460 (°C.)
E-modulus: DIN 53 457 (bending) (G Pa)
Bending stress $\Sigma_{bf}$: DIN 53 452 (M Pa)
Ball indentation hardness $H_{c,30\,sec}$: DIN 53 456 (M Pa)

5. Ageing Tests

The following apparatus were used for these tests:

| | | |
|---|---|---|
| a | Atlas Fadeometer | |
| | Conditions: | carbon arc lamp |
| | | black panel temperature 50–55° C. |
| | | relative air humidity 18–20% |
| b | Weatherometer | |
| | Conditions: | carbon arc lamp |
| | | rotating specimen drum and spraying unit |
| | | raining cycle 17 minutes' exposure |
| | | 3 minutes' exposure and spraying |
| | | black panel temperature |
| | | before spraying 42° C. |
| | | after spraying 22° C. |

EXAMPLE I

3 Polymer blends containing different rubber components in the same quantity of 6.25% by weight are compared in this Example.

| Graft polymer | No. 1 in Table 1 | Graft polymer O | Graft polymer P |
|---|---|---|---|
| Parts by weight of the graft polymer | 12.5 | 12.5 | 12.5 |
| Parts by weight of PVC type Z | 87.5 | 87.5 | 87.5 |
| Parts by weight of rubber in the mixture as a whole | 6.25 | 6.25 | 6.25 |
| $a_k$, 20° C.(kJ/m$^2$) | 70 | 59 | 20 |
| Hc, 30″ (MPa) | 91.7 | 98.1 | 98.3 |
| Vicat temperature (°C.) | 84 | 86 | 83 |
| $\zeta bF$ (MPa) | 77.7 | 82.5 | 82.9 |
| Colour of test specimen after 250 h Fadeometer testing | white | brown | white |
| 750 h Fadeometer testing | white | dark brown | white |
| Colour of test specimen after 2000 h Weatherometer testing | white | dark brown | white |

It can clearly be seen that the polymer mixture based on an EPDM-graft polymer has the highest not c hed impact strength. It is also clear that, in contrast to the butadien-containing graft polymer O, the moulding compositions according to the invention are comparable in their resistance to light and weather with a high impact PVC containing a copolymer of ethylene/vinyl acetate as its rubber component.

EXAMPLE II

In this Example, the EPDM-rubbers claimed in accordance with the invention are varied. Standard-commercial grade products and laboratory preparations are used. In all the polymer blends, the rubber content amounts to 6.25%.

| Description of the graft polymer according to Table 1 | 1 | 2 | 3 | 4 | 5 |
|---|---|---|---|---|---|
| Parts by weight of the graft polymer | 12.5 | 12.5 | 12.5 | 12.5 | 12.5 |
| Parts by weight of PVC type Y | 87.5 | 87.5 | 87.5 | 87.5 | 87.5 |
| $a_k$, 20° C. (kJ/m$^2$) | 70 | 63 | 68 | 71 | 58 |
| Hc, 30" (MPa) | 91.7 | 94.3 | 95.7 | 92.8 | 96.1 |
| Vicat temperature (°C.) | 84 | 86 | 84 | 83 | 85 |
| $\zeta$bF (MPa) | 77.7 | 75.1 | 78.9 | 79.4 | 77.6 |

As can be seen from the mechanical data, the property spectrum is scarcely affected by the choice of the EPDM-rubber used as graft base. It is of decisive significance that the notched impact strength varies within limits of 58 and 71 kJ/m$^2$.

EXAMPLE III

The following Example illustrates the relationship between the ratio of graft base to graft monomer selected and the variation in the solvent and the elasticising effect of the graft polymer in admixture with rigid PVC.

| Description of the graft polymer according to Table 1 | 6 | 7 | 8 | 11 | 9 | 10 | 11 |
|---|---|---|---|---|---|---|---|
| Parts by weight of graft polymer | 20 | 13.3 | 12 | 7.5 | 12 | 12 | 12 |
| Parts by weight of PVC type Y | 80 | 86.7 | 88 | 92.5 | 88 | 88 | 88 |
| $a_k$, 20° C. (kJ/m$^2$) | 10 | 27 | 55 | 7 | 24 | 13 | 4 |
| $a_k$, 0° C. (kJ/m$^2$) | 7 | 9 | 13 | 3 | 12 | 6 | 3 |
| $a_k$, −20° C. (kJ/m$^2$) | 5 | 5 | 6 | 1 | 5 | 3 | 2 |
| Hc, 30" (MPa) | 98.2 | 96.9 | 94.1 | 91.0 | 86.4 | 80.4 | 71.0 |
| $\zeta$bF (MPa) | 86.0 | 81.8 | 81.3 | 74.8 | 77.8 | 72.0 | 62.3 |
| Vicat temperature (°C.) | 84 | 83 | 82 | 81 | 82 | 81 | 79 |

| Description of the graft polymer according to Table 1 | 6 | 7 | 8 | 11 | 9 | 10 | 11 |
|---|---|---|---|---|---|---|---|
| % EPDM in the PVC-blend | 6.0 | 6.0 | 6.0 | 6.0 | 7.2 | 8.4 | 9.6 |

With a comparable amount of EPDM in the mixture as a whole of 6%, notched impact strength increases with increasing EPDM-content and decreases again after passing through a maximum. Accordingly, there is an optimum range in regard to the concentration of EPDM in the graft polymer which lies between about 35 and 70% by weight of EPDM in the graft base.

EXAMPLE IV

The following Example demonstrates the relationship between notched impact strength and increasing quantities of added EPDM-graft polymer with constant composition.

| Graft polymer | No. 12 according to Table 1 | | | | | | Graft polymer P | | |
|---|---|---|---|---|---|---|---|---|---|
| Parts by weight of graft polymer | — | 5 | 10 | 15 | 20 | 25 | 10 | 16 | 20 |
| Parts by weight of PVC type Y | 100 | 95 | 90 | 85 | 80 | 75 | 90 | 84 | 80 |
| Parts by weight of rubber in the mixture as a whole | — | 2.5 | 5.0 | 7.5 | 10.0 | 12.5 | 5.0 | 8.0 | 10.0 |
| $a_n$, 20° C. (kJ/m$^2$) | ub | ub | ub | ub | ub | ub | ub | ub | ub |
| $a_n$, −20° C. (kJ/m$^2$) | " | " | " | " | " | " | " | " | " |
| $a_k$, RT (kJ/m$^2$) | 3 | 6 | 22 | 72 | 77 | 82 | 12 | 33 | 41 |
| $a_k$, 0° C. (kJ/m$^2$) | 2 | 4 | 8 | 17 | 18 | 42 | 6 | 8 | 9 |
| $a_k$, −20° C. (kJ/m$^2$) | 2 | 4 | 6 | 8 | 16 | 17 | 4 | 4 | 6 |
| $H_c$, 30" (MPa) | 122.5 | 104.8 | 92.4 | 79.5 | 70.1 | 63.6 | 82.7 | 81.0 | 78.0 |
| $\zeta$bF (MPa) | 97.5 | 94.4 | 84.9 | 75.0 | 66.8 | 60.4 | 79.8 | 64.8 | 5.55 |
| E-modulus (GPa) | 3.2 | 3.1 | 3.0 | 2.66 | 2.26 | 2.02 | 2.58 | 2.42 | 2.15 |
| Vicat temperature (°C.) | 85 | 84 | 86 | 82 | 82 | 80 | 81 | 79 | 78 | ub = unbroken

The impact strength of the polymer blends is excellent; all the test specimens pass the impact test. Notched impact strength increases steadily with increasing quantity of EPDM-graft polymer and, for a content of 25% by weight reaches 82 kJ/m$^2$. The excellent notched impact strength at 0° C. and −20° C. is worth emphasising. The mechanical values of mixtures of PVC and an ethylene/vinyl acetate graft polymer were measured for comparison. For a comparable rubber concentration in the mixture as a whole of from 5 to 10% by weight, the notched impact strength values are distinctly lower than those of the EPDM-modified product. The poorer low-temperature strength of the product based on ethylene/vinyl acetate is particularly noticeable.

In order to adjust the optimum values for the ethylene/vinyl acetate/PVC-system, the corresponding mixtures with the PVC type Y were prepared at a processing temperature of 170° C.

EXAMPLE V

This Example shows that mixtures of graft polymers with different EPDM-contents in admixture with PVC also have an elasticising effect.

| Description of graft polymer according to Table 1 | 11 | 11 | 11 | 11 |
|---|---|---|---|---|
| Parts by weight of graft polymer | — | 2.8 | 3.9 | 5.1 | 7.8 |
| Description of graft polymer according to Table 1 | 4 | 4 | 4 | 4 |
| Parts by weight of graft | | | | |

-continued

| polymer | 12.5 | 8.1 | 6.3 | 4.2 | — |
|---|---|---|---|---|---|
| Parts by weight of PVC type Y | 87.5 | 89.1 | 89.8 | 90.7 | 92.2 |
| $a_k$, 20° C. (kJ/m$^2$) | 70 | 50 | 56 | 32 | 6 |
| $H_c$, 30" (MPa) | 91.7 | 98.4 | 99.4 | 101.4 | 91.1 |
| $\zeta bF$ (MPa) | 77.7 | 76.3 | 76.3 | 77.6 | 78.6 |
| Vicat temperature (°C.) | 84 | 85 | 85 | 85 | 83 |

The mixtures of the two graft polymers with PVC were adjusted in such a way that the polymer blends under comparison here each contain 6.25% of EPDM-rubber. It is noticeable that the only very weakly active product No. 11 (according to Table 1) with an EPDM-content of 80% in admixture with graft polymer No. 4 (according to Table 1) develops very considerable toughness levels. Accordingly, the negative effect of the pure product No. 11 is compensated by mixing with component 4.

EXAMPLE VI

As already described, a major advantage of the moulding compositions according to the invention is the fact that they are largely unaffected by processing influences, especially high processing temperatures. In the present Example, a polymer blend containing 6% of EPDM is compared with a high impact PVC based on an ethylene/vinyl acetate copolymer. Both polymer blends contain 6% of rubber.

|  | $H_c$, 30" (MPa) | $a_k$, RT (kJ/m$^2$) | Vicat temperature (°C.) | $\zeta bF$ (MPa) | Processing temp. (°C.) |
|---|---|---|---|---|---|
| (a) 13.3 parts by weight of graft | 102.6 | 45 | 78 | 77.7 | 180 |
| polymer No. 13 according to | 101.7 | 38 | 78 | 78.3 | 190 |
| Table 1 | 108.1 | 19 | 78 | 81.2 | 200 |
| 86.7 parts by weight of PVC type Z | 110.2 | 12 | 78 | 81.9 | 210 |
| (b) 12 parts by weight of graft | 104.1 | 34 | 78 | 78.7 | 180 |
| polymer P | 107.3 | 8 | 78 | 80.9 | 190 |
| 88 parts by weight of PVC | 106.9 | 5 | 78 | 81.2 | 200 |
| type Z | 108.1 | 3 | 78 | 81.4 | 210 |

The polymer mixtures are each homogenised for 10 minutes at increasing temperatures on mixing rolls (cf. Section "production of the PVC-blends", and subsequently processed into test specimens. It is clearly apparent that the notched impact strength of mixture (a) remains substantially constant with increasing rolling and pressing temperature up to 190° C. and then gradually decreases. In contrast, there is a drastic reduction in notched impact strength to 8 kJ/m$^2$ at only 190° C. in the case of mixture (b) which was produced using an ethylene/vinyl acetate/vinyl chloride graft polymer and which, in regard to resistance to weather and ageing, is among the best commercially available products.

Accordingly, product (a) in terms of processing under practical conditions has a 20° to 30° C. wider processing range which is of the utmost importance in regard to evaluation of the products according to the invention in relation to the prior art.

EXAMPLE VII

In order to round off the overall picture, the polymerisation temperature (EPDM-graft polymers 14–16), the activator (polymer No. 19) and the monomers grafted on (polymers 17+18) were all varied within the range according to the invention in the production of the EPDM-graft polymers in the following Example.

| Graft polymer according to Table 1 | 14 | 15 | 16 | 17 | 18 | 19 |
|---|---|---|---|---|---|---|
| Parts by weight of graft polymer | 14.5 | 14.5 | 14.5 | 12.5 | 12.5 | 12.5 |
| Parts by weight of PVC type Y | 85.5 | 85.5 | 85.5 | 87.5 | 87.5 | 87.5 |
| $a_k$, 20° C. (kJ/m$^2$) | 17 | 30 | 6 | 28 | 10 | 29 |
| $H_c$, 30" (MPa) | 95.5 | 93.8 | 97.2 | 95.5 | 80.5 | 103.5 |
| $\zeta bF$ (MPa) | 80.1 | 83.2 | 82.4 | 78.5 | 66.2 | 97.0 |
| Vicat temperature | 81 | 80 | 80 | 80 | 78 | 82 |

It can clearly be seen that for the same composition of the polymers, the polymerisation temperature influences the notched impact strength which can be obtained in the polymer blend. The product based on graft polymer No. 16 with the totally inadequate notched impact strength of 6 kJ/m$^2$ lies outside the range according to the invention with its polymerisation temperature of 80° C.

EXAMPLE VIII

This example shows that even at low graft ratios the favourable properties are not impared. The graft ratio of the EPDM graft polymer is reduced in a controlled way by adding styrene acrylonitrile resin. 35 parts by weight of the EPDM graft copolymer No. 4 of table 1 and 65 parts by weight of a styrene acrylonitrile copolymer (molecular weight determined from viscosity in dimethyl formamide at 20° C., $M\eta=130.000$, molecular heterogenity $U=Mw/Mn-1=2,1$ acrylonitrile content 28% by weight) are compounded at 220° C. on a rubber mill to form a sheet. The sheet is granulated after cooling. The resulting mixture has an EPDM rubber content of 17.5% by weight. This product is compounded with polyvinylchloride on a rubber mill at a temperature of 185° C. for 10 minutes and subsequently shaped under pressure for 10 minutes at 185° C. Numerical values and mechanical data are summarized in Table 2.

TABLE 2

| Mixture No. | 1 | 2 | 3 | 4 | 5 | 6 | 7 |
|---|---|---|---|---|---|---|---|
| parts by weight polyvinylchloride | 80 | 70 | 60 | 50 | 40 | 30 | 20 |
| parts by weight graft polymer | 20 | 30 | 40 | 50 | 60 | 70 | 80 |
| parts by weight of rubber in mixture | 3,5 | 5,25 | 7,0 | 8,75 | 10,5 | 12,2 | 14 |
| $a_n$, 20° C. (kJ/m$^2$) | nb | nb | nb | nb | nb | nb | nb |
| $a_n$, −20° C. (kJ/m$^2$) | nb | nb | nb | nb | nb | nb | nb |

TABLE 2-continued

| Mixture No. | | 1 | 2 | 3 | 4 | 5 | 6 | 7 |
|---|---|---|---|---|---|---|---|---|
| $a_k$, RT | (kJ/m$^2$) | 6 | 31 | 32 | 25 | 28 | 11 | 9 |
| $H_c$, 30" | (MPa) | 114,5 | 86,5 | 90,9 | 96,4 | 99,0 | 102,7 | 107,2 |
| $\zeta F$ | (MPa) | 90,6 | 63,3 | 68,2 | 71,8 | 76,5 | 81,6 | 86,2 | nb = not broken

We claim:

1. A thermoplastic moulding composition consisting essentially of
   (A) from 20 to 99 parts by weight of a vinyl chloride homopolymer or copolymer containing at least 80% by weight of vinyl chloride and having K-values of from 50 to 80; and
   (B) from 80 to 1 part by weight of a graft polymer produced by the solution polymerization in an organic solvent monomers consisting essentially of
      (a) a member selected from the group consisting of styrene, 2-methyl styrene, methyl methacrylate and mixtures thereof or
      (b) acrylonitrile mixed with a member selected from the group consisting of styrene, 2-methyl styrene, methyl methacrylate and mixtures thereof in the presence of EPDM rubber.

2. A thermoplastic moulding composition as claimed in claim 1 wherein (A) is 70 to 99% by weight and (B) is 30 to 1 part by weight.

3. A thermoplastic moulding composition as claimed in claim 1, wherein the EPDM rubber has a Mooney plasticity (ML1+4', 100° C.) of from 20 to 150.

4. A moulding composition as claimed in claim 1, wherein the graft polymer (B) has been produced in an aromatic solvent or aromatic solvent mixture.

5. A moulding composition as claimed in claim 1, wherein the graft polymer (B) has been produced by polymerisation at a temperature above 80° C. with a ratio by weight of solvent:graft polymer plus graft base of from 2.5:1 to 10.1, a ratio by weight of graft base:-graft monomer of from 0.33:1 to 4:1 and a ratio by weight of styrene:acylonitrile of from 1:1 to 9:1.

6. A moulding composition as claimed in claim 1, wherein the diene component in the EPDM rubber is 5-ethylidene-2-norbornene, dicyclopentadiene or 1,4-hexadiene.

7. A thermoplastic moulding composition as claimed in claim 1 containing:
   (A) from 75 to 96 parts by weight of polyvinyl chloride with a K-value of from 50 to 80; and
   (B) from 25 to 4 parts by weight of a graft polymer produced by the solution polymerisation in benzene, toluene or a mixture thereof at 100° C. to 140° C. of styrene and acrylonitrile in the presence of an EPDM rubber with ethylidene-2-norbornene, dicyclopentadiene or 1,4-hexadiene as diene component.

* * * * *